(12) United States Patent
Ganmukhi et al.

(10) Patent No.: US 6,192,046 B1
(45) Date of Patent: *Feb. 20, 2001

(54) APPARATUS AND METHOD FOR EFFICIENTLY TRANSFERRING ATM CELLS ACROSS A BACKPLANE IN A NETWORK SWITCH

(75) Inventors: Mahesh N. Ganmukhi, Carlisle; Patrick L. DeAngelis, Northborough; Siu Wing Li, Chelmsford, all of MA (US)

(73) Assignee: Ascend Communications, Inc., Westford, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/921,980

(22) Filed: Aug. 28, 1997

(51) Int. Cl.[7] .................................................. H04L 12/28
(52) U.S. Cl. ............................................. 370/366; 370/423
(58) Field of Search ................................... 370/360, 366, 370/367, 368, 369, 395, 412, 419, 422, 423, 424, 427, 428, 429, 465, 466

(56) References Cited

U.S. PATENT DOCUMENTS

| 4,064,360 | * | 12/1977 | Koenig | 370/366 |
|---|---|---|---|---|
| 4,123,624 | * | 10/1978 | Gagnier et al. | 370/366 |
| 4,392,221 | * | 7/1983 | Hesketh | 370/366 |
| 4,878,215 | * | 10/1989 | Rogers | 370/366 |
| 4,975,901 | * | 12/1990 | Poli | 370/360 |
| 5,007,050 | * | 4/1991 | Kasparian et al. | 370/280 |
| 5,046,064 | * | 9/1991 | Suzuki et al. | 370/414 |
| 5,189,666 | * | 2/1993 | Kagawa | 370/395 |
| 5,440,550 | * | 8/1995 | Follett | 370/427 |
| 5,475,679 | * | 12/1995 | Munter | 370/395 |
| 5,485,455 | * | 1/1996 | Dobbins et al. | 370/255 |
| 5,726,990 | * | 3/1998 | Shimada et al. | 370/536 |
| 5,835,498 | * | 11/1998 | Kim et al. | 370/537 |

* cited by examiner

*Primary Examiner*—Chi H. Pham
*Assistant Examiner*—Kwang B. Yao
(74) *Attorney, Agent, or Firm*—Weingarten, Schurgin, Gagnebin & Hayes LLP

(57) ABSTRACT

The present invention is directed to an apparatus and method for efficiently transferring asynchronous transfer mode (ATM) cells across a backplane in a network switch. The present invention is realized through an electrical apparatus that converts parallel data that is received on parallel data input ports to serial data that is transmitted on serial data output ports. The parallel data that is received on each parallel data input port is divided and transmitted from a corresponding pair of serial data output ports. The electrical apparatus also converts serial data that is received on serial data input ports to parallel data that is transmitted on parallel data output ports. The serial data that is received on a corresponding pair of serial data input ports is combined and transmitted from a parallel data output port.

6 Claims, 13 Drawing Sheets

| REGISTER | DATA | INDIRECT READ ADDRESS | INDIRECT WRITE ADDRESS | Reserved |
|---|---|---|---|---|
| REGISTER TYPE | R/W | R/W | R/W | R |
| ADDRESS | 0 | 1 | 2 | 3 |
| BIT 7 | Data 7 | 0 | 0 | 0 |
| BIT 6 | Data 6 | 0 | 0 | 0 |
| BIT 5 | Data 5 | Addr5 | Addr5 | 0 |
| BIT 4 | Data 4 | Addr4 | Addr4 | 0 |
| BIT 3 | Data 3 | Addr3 | Addr3 | 0 |
| BIT 2 | Data 2 | Addr2 | Addr2 | 0 |
| BIT 1 | Data 1 | Addr1 | Addr1 | 0 |
| BIT 0 | Data 0 | Addr0 | Addr0 | 0 |

FIG. 8

| REGISTER | PARALLEL PORT ENABLE | PARALLEL PORT LOOPBACK | PARALLEL LOSS OF CLOCK STATUS | PARALLEL LOSS OF CLOCK MASK | PARALLEL SOC ERROR STATUS | PARALLEL SOC ERROR MASK | PARALLEL PARITY ERROR STATUS | PARALLEL PARITY ERROR MASK |
|---|---|---|---|---|---|---|---|---|
| TYPE | R/W | R/W | R/W | R/W | R/W | R/W | R/W | R/W |
| IND. ADDR | 0 | 1 | 2 | 3 | 4 | 5 | 6 | 7 |
| BIT 7 | Port 8 | Port 8 | Port 8 | Port 8 | Port 8 | Port 8 | Port 8 | Port 8 |
| BIT 6 | Port 7 | Port 7 | Port 7 | Port 7 | Port 7 | Port 7 | Port 7 | Port 7 |
| BIT 5 | Port 6 | Port 6 | Port 6 | Port 6 | Port 6 | Port 6 | Port 6 | Port 6 |
| BIT 4 | Port 5 | Port 5 | Port 5 | Port 5 | Port 5 | Port 5 | Port 5 | Port 5 |
| BIT 3 | Port 4 | Port 4 | Port 4 | Port 4 | Port 4 | Port 4 | Port 4 | Port 4 |
| BIT 2 | Port 3 | Port 3 | Port 3 | Port 3 | Port 3 | Port 3 | Port 3 | Port 3 |
| BIT 1 | Port 2 | Port 2 | Port 2 | Port 2 | Port 2 | Port 2 | Port 2 | Port 2 |
| BIT 0 | Port 1 | Port 1 | Port 1 | Port 1 | Port 1 | Port 1 | Port 1 | Port 1 |

| REGISTER | PARALLEL CELL ERR COUNTER PORT 1 | PARALLEL CELL ERR COUNTER PORT 2 | PARALLEL CELL ERR COUNTER PORT 3 | PARALLEL CELL ERR COUNTER PORT 4 | PARALLEL CELL ERR COUNTER PORT 5 | PARALLEL CELL ERR COUNTER PORT 6 | PARALLEL CELL ERR COUNTER PORT 7 | PARALLEL CELL ERR COUNTER PORT 8 |
|---|---|---|---|---|---|---|---|---|
| TYPE | R | R | R | R | R | R | R | R |
| IND. ADDR | 8 | 9 | A | B | C | D | E | F |
| BIT 7 | CNT7 | CNT7 | CNT7 | CNT7 | CNT7 | CNT7 | CNT7 | CNT7 |
| BIT 6 | CNT6 | CNT6 | CNT6 | CNT6 | CNT6 | CNT6 | CNT6 | CNT6 |
| BIT 5 | CNT5 | CNT5 | CNT5 | CNT5 | CNT5 | CNT5 | CNT5 | CNT5 |
| BIT 4 | CNT4 | CNT4 | CNT4 | CNT4 | CNT4 | CNT4 | CNT4 | CNT4 |
| BIT 3 | CNT3 | CNT3 | CNT3 | CNT3 | CNT3 | CNT3 | CNT3 | CNT3 |
| BIT 2 | CNT2 | CNT2 | CNT2 | CNT2 | CNT2 | CNT2 | CNT2 | CNT2 |
| BIT 1 | CNT1 | CNT1 | CNT1 | CNT1 | CNT1 | CNT1 | CNT1 | CNT1 |
| BIT 0 | CNT0 | CNT0 | CNT0 | CNT0 | CNT0 | CNT0 | CNT0 | CNT0 |

FIG. 11

| REGISTER | PARALLEL MUX SELECT PORT 1 | PARALLEL MUX SELECT PORT 2 | PARALLEL MUX SELECT PORT 3 | PARALLEL MUX SELECT PORT 4 | PARALLEL MUX SELECT PORT 5 | PARALLEL MUX SELECT PORT 6 | PARALLEL MUX SELECT PORT 7 | PARALLEL MUX SELECT PORT 8 |
|---|---|---|---|---|---|---|---|---|
| TYPE | R/W | R/W | R/W | R/W | R/W | R/W | R/W | R/W |
| IND. ADDR | 10 | 11 | 12 | 13 | 14 | 15 | 16 | 17 |
| BIT 7 | 0 | 0 | 0 | 0 | 0 | 0 | 0 | 0 |
| BIT 6 | 0 | 0 | 0 | 0 | 0 | 0 | 0 | 0 |
| BIT 5 | 0 | 0 | 0 | 0 | 0 | 0 | 0 | 0 |
| BIT 4 | 0 | 0 | 0 | 0 | 0 | 0 | 0 | 0 |
| BIT 3 | 0 | 0 | 0 | 0 | 0 | 0 | 0 | 0 |
| BIT 2 | SEL2 | SEL2 | SEL2 | SEL2 | SEL2 | SEL2 | SEL2 | SEL2 |
| BIT 1 | SEL1 | SEL1 | SEL1 | SEL1 | SEL1 | SEL1 | SEL1 | SEL1 |
| BIT 0 | SEL0 | SEL0 | SEL0 | SEL0 | SEL0 | SEL0 | SEL0 | SEL0 |

FIG. 12

| REGISTER | SERIAL PORT ENABLE | SERIAL PORT LOOPBACK | SERIAL PORT STATUS | SERIAL PORT STATUS MASK | SERIAL BIP-8 ERROR | SERIAL BIP-8 ERROR MASK | SYNC DECODE NORMAL | SYNC DECODE SWITCH |
|---|---|---|---|---|---|---|---|---|
| TYPE | R/W | R/W | R/W | R/W | R/W | R/W | R/W | R/W |
| IND. ADDR | 18 | 19 | 1A | 1B | 1C | 1D | 1E | 1F |
| BIT 7 | PORT 8 | 0 | 5-8 OVER | 5-8 OVER | PORT 8 | PORT 8 | 0 | 0 |
| BIT 6 | PORT 7 | 0 | 5-8 GONE | 5-8 GONE | PORT 7 | PORT 7 | reserved | reserved |
| BIT 5 | PORT 6 | 0 | 5-8 SOC | 5-8 SOC | PORT 6 | PORT 6 | reserved | reserved |
| BIT 4 | PORT 5 | PORT 5-8 | 5-8 LOC | 5-8 LOC | PORT 5 | PORT 5 | reserved | reserved |
| BIT 3 | PORT 4 | 0 | 1-4 OVER | 1-4 OVER | PORT 4 | PORT 4 | reserved | reserved |
| BIT 2 | PORT 3 | 0 | 1-4 GONE | 1-4 GONE | PORT 3 | PORT 3 | reserved | reserved |
| BIT 1 | PORT 2 | 0 | 1-4 SOC | 1-4 SOC | PORT 2 | PORT 2 | reserved | reserved |
| BIT 0 | PORT 1 | PORT 1-4 | 1-4 LOC | 1-4 LOC | PORT 1 | PORT 1 | 0 | 0 |

FIG. 13

| REGISTER | SERIAL CELL ERR COUNTER PORT 1 | SERIAL CELL ERR COUNTER PORT 2 | SERIAL CELL ERR COUNTER PORT 3 | SERIAL CELL ERR COUNTER PORT 4 | SERIAL CELL ERR COUNTER PORT 5 | SERIAL CELL ERR COUNTER PORT 6 | SERIAL CELL ERR COUNTER PORT 7 | SERIAL CELL ERR COUNTER PORT 8 |
|---|---|---|---|---|---|---|---|---|
| TYPE | R | R | R | R | R | R | R | R |
| IND. ADDR | 20 | 21 | 22 | 23 | 24 | 25 | 26 | 27 |
| BIT 7 | CNT7 | CNT7 | CNT7 | CNT7 | CNT7 | CNT7 | CNT7 | CNT7 |
| BIT 6 | CNT6 | CNT6 | CNT6 | CNT6 | CNT6 | CNT6 | CNT6 | CNT6 |
| BIT 5 | CNT5 | CNT5 | CNT5 | CNT5 | CNT5 | CNT5 | CNT5 | CNT5 |
| BIT 4 | CNT4 | CNT4 | CNT4 | CNT4 | CNT4 | CNT4 | CNT4 | CNT4 |
| BIT 3 | CNT3 | CNT3 | CNT3 | CNT3 | CNT3 | CNT3 | CNT3 | CNT3 |
| BIT 2 | CNT2 | CNT2 | CNT2 | CNT2 | CNT2 | CNT2 | CNT2 | CNT2 |
| BIT 1 | CNT1 | CNT1 | CNT1 | CNT1 | CNT1 | CNT1 | CNT1 | CNT1 |
| BIT 0 | CNT0 | CNT0 | CNT0 | CNT0 | CNT0 | CNT0 | CNT0 | CNT0 |

| REGISTER | SERIAL MUX SELECT PORT 1 | SERIAL MUX SELECT PORT 2 | SERIAL MUX SELECT PORT 3 | SERIAL MUX SELECT PORT 4 | SERIAL MUX SELECT PORT 5 | SERIAL MUX SELECT PORT 6 | SERIAL MUX SELECT PORT 7 | SERIAL MUX SELECT PORT 8 |
|---|---|---|---|---|---|---|---|---|
| TYPE | R/W | R/W | R/W | R/W | R/W | R/W | R/W | R/W |
| IND. ADDR | 28 | 29 | 2A | 2B | 2C | 2D | 2E | 2F |
| BIT 7 | 0 | 0 | 0 | 0 | 0 | 0 | 0 | 0 |
| BIT 6 | 0 | 0 | 0 | 0 | 0 | 0 | 0 | 0 |
| BIT 5 | 0 | 0 | 0 | 0 | 0 | 0 | 0 | 0 |
| BIT 4 | 0 | 0 | 0 | 0 | 0 | 0 | 0 | 0 |
| BIT 3 | 0 | 0 | 0 | 0 | 0 | 0 | 0 | 0 |
| BIT 2 | SEL2 | SEL2 | SEL2 | SEL2 | SEL2 | SEL2 | SEL2 | SEL2 |
| BIT 1 | SEL1 | SEL1 | SEL1 | SEL1 | SEL1 | SEL1 | SEL1 | SEL1 |
| BIT 0 | SEL0 | SEL0 | SEL0 | SEL0 | SEL0 | SEL0 | SEL0 | SEL0 |

*FIG. 14*

| REGISTER | MODE CONTROL | SWITCH-OVER CONTROL | SWITCH-OVER IDLE LIMIT | BACK-PRESSURE CONTROL | PLL MIN | PLL MAX | RAM BIST CONTROL | RAM BIST RESULTS PRAM1-8 | RAM BIST RESULTS SRAM1-4 |
|---|---|---|---|---|---|---|---|---|---|
| TYPE | R/W | R/W | R/W | R/W | R | R | R/W | R | R |
| IND. ADDR | 30 | 31 | 32 | 33 | 34 | 35 | 36 | 37 | 38 |
| BIT 7 | SW_RST | PD_ENB | LIM7 | 0 | 0 | 0 | DONE* | FAIL8 | 0 |
| BIT 6 | PARITY_EN | SW_SF | LIM6 | 0 | MIN6 | MAX6 | 0 | FAIL7 | 0 |
| BIT 5 | PD | EN_RESYNC | LIM5 | 0 | MIN5 | MAX5 | 0 | FAIL6 | 0 |
| BIT 4 | PLL_DIS | EN_HW_SW | LIM4 | 0 | MIN4 | MAX4 | 0 | FAIL5 | 0 |
| BIT 3 | reserved | EN_HW_BP | LIM3 | 0 | MIN3 | MAX3 | 0 | FAIL4 | FAIL4 |
| BIT 2 | SWITCH | TSEL2 | LIM2 | 0 | MIN2 | MAX2 | BRESETN | FAIL3 | FAIL3 |
| BIT 1 | SER_RST | TSEL1 | LIM1 | BP_VALUE | MIN1 | MAX1 | MODE1 | FAIL2 | FAIL2 |
| BIT 0 | START | TSEL0 | LIM0 | FORCE_BP | MIN0 | MAX0 | MODE0 | FAIL1 | FAIL1 |

*FIG. 15*

| BYTE # | 7 | 6 | 5 | 4 | 3 | 2 | 1 | 0 |
|---|---|---|---|---|---|---|---|---|
| 1 | \multicolumn{8}{c} node tag header |
| 2 | " | | | | | | | |
| 3 | " | | | | | | | |
| 4 | " | | | | | | | |
| 5 | " | | | | | | | |
| 6 | " | | | | | | | |
| 7 | " | | | | | | | |
| 8 | " | | | | | | | |
| 9 | " | | | | | | | |
| 10 | " | | | | | | | |
| 11 | " | | | | | | | |
| 12 | " | | | | | | | |
| 13 | " | | | | | | | |
| 14 | " | | | | | | | |
| 15 | " | | | | | | | |
| 16 | " | | | | | | | |
| 17-64 | payload (1:48) | | | | | | | |
| 65 | 0 | 0 | 0 | 0 | 0 | 0 | 0 | 0 |
| 66 | 0 | 0 | 0 | 0 | 0 | 0 | 0 | 0 |
| 67 | 0 | 0 | 0 | 0 | 0 | 0 | 0 | 0 |
| 68 | 0 | 0 | 0 | 0 | 0 | 0 | 0 | 0 |

| BYTE # | 7 | 6 | 5 | 4 | 3 | 2 | 1 | 0 |
|---|---|---|---|---|---|---|---|---|
| 1 | 0 | 0 | 0 | 0 | 0 | 0 | 0 | 0 |
| 2 | 0 | 0 | 0 | 0 | 0 | 0 | 0 | 0 |
| 3 | 1 | 1 | 1 | 1 | 1 | 1 | 1 | 1 |
| 4-68 | 0 | 0 | 0 | 0 | 0 | 0 | 0 | 0 |

FIG. 18

| | 7 | 6 | 5 | 4 | 3 | 2 | 1 | 0 |
|---|---|---|---|---|---|---|---|---|
| BYTE 1 | 0 | 0 | 0 | 0 | 1 | 1 | 1 | 1 |
| BYTE 2 | 0 | 0 | 1 | 1 | 0 | 0 | 1 | 1 |
| BYTE 3 | 0 | 1 | 0 | 1 | 0 | 1 | 0 | 1 |
| BIP-8 | 1 | 0 | 0 | 1 | 0 | 1 | 1 | 0 |

| RESULT | 1 | 1 | 1 | 1 | 1 | 1 | 1 | 1 |
|---|---|---|---|---|---|---|---|---|

FIG. 19

APPARATUS AND METHOD FOR EFFICIENTLY TRANSFERRING ATM CELLS ACROSS A BACKPLANE IN A NETWORK SWITCH

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

The present invention relates generally to network switches and, more particularly, to an apparatus and method for efficiently transferring ATM cells across a backplane in a network switch.

BACKGROUND OF THE INVENTION

Network switches provide signal connections between a plurality of input ports and a plurality of output ports. Each network switch typically comprises at least one switch fabric for facilitating these signal connections. The signal connections are made between the switch fabric and the input ports and the output ports.

Each switch fabric is typically located on its own printed circuit board within the network switch. Likewise, any circuitry that is associated with the input ports and the output ports is typically located on separate printed circuit boards within the network switch. A motherboard or backplane is provided in order for the signal connections to be made between the switch fabric and the input ports and the output ports. That is, the backplane provides physical connections between the switch fabric and the input ports and the output ports. It is over these physical connections that the signal connections are made.

Depending on the size of the network switch, it may be required that a large number of signal connections must be made between the switch fabric and the input ports and the output ports, and, correspondingly, a large number of physical connections must be made across the backplane between the switch fabric printed circuit board and the printed circuit board(s) associated with the input ports and the output ports. There are problems associated with such a large number of physical connections being made across a backplane, including printed circuit board area limitations and signal noise interference. Accordingly, it would be beneficial to reduce the number of physical connections that must be made across the backplane between the switch fabric printed circuit board and the printed circuit board(s) associated with the input ports and the output ports, while not reducing the data rate associated with the signal connections.

In addition to the benefit of reducing the number of physical connections between the switch fabric printed circuit board and the printed circuit board(s) associated with the input ports and the output ports, it would also be beneficial to utilize the reduced number of physical connections in a most efficient manner. That is, it would be beneficial to utilize the reduced number of physical connections between the switch fabric printed circuit board and the printed circuit board(s) associated with the input ports and the output ports in an efficient manner so that signal connections may be made to provide for signal redundancy and to compensate for hardware failures. Accordingly, it would be desirable to provide an apparatus and method for efficiently transferring data across a backplane in a network switch.

SUMMARY OF THE INVENTION

The present invention is directed to an apparatus and method for efficiently transferring asynchronous transfer mode (ATM) cells across a backplane in a network switch. The present invention is realized through an electrical apparatus that converts parallel data that is received on parallel data input ports to serial data that is transmitted on serial data output ports. The parallel data that is received on each parallel data input port is divided and transmitted from a corresponding pair of serial data output ports. The electrical apparatus also converts serial data that is received on serial data input ports to parallel data that is transmitted on parallel data output ports. The serial data that is received on a corresponding pair of serial data input ports is combined and transmitted from a parallel data output port.

In addition to converting parallel input data to serial output data and converting serial input data to parallel output data, the electrical apparatus can direct converted parallel input data from any of the parallel data input ports to any of the corresponding pairs of serial data output ports and can direct converted serial input data from any of the corresponding pairs of serial data input ports to any of the parallel data output ports.

The electrical apparatus can also direct converted parallel input data from any of the parallel data input ports to more than one of the corresponding pairs of serial data output ports. The electrical apparatus can also direct converted serial input data from any of the corresponding pairs of serial data input ports to more than one parallel data output ports.

The electrical apparatus can further direct converted serial input data from more than one of the corresponding pairs of serial data input ports to a single parallel data output port. The electrical apparatus can further direct converted parallel input data from a single parallel data input port to either of one or another of the corresponding pairs of serial data output ports according to the value of a switching bit in a cell header of the converted parallel input data.

The above-described functions of the electrical apparatus allow the number of physical connections that must be made across a backplane in a network switch to be reduced, while not reducing the data rate associated with signal connections utilizing those physical connections. Furthermore, the above-described functions of the electrical apparatus allow the reduced number of physical connections to be used in an efficient manner so that signal connections may be made to provide for signal redundancy and to compensate for hardware failures in the network switch.

In view of the foregoing, it is readily apparent that the primary object of the present invention is to provide an apparatus and method for efficiently transferring ATM cells across a backplane in a network switch.

The above-stated primary object, as well as other objects, features, and advantages, of the present invention will become more readily apparent from the following detailed description which is to be read in conjunction with the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 8 is a register map of the DATA register, the INDIRECT READ ADDRESS register, and the INDIRECT WRITE ADDRESS register for the electrical apparatus shown in FIG. 1.

FIG. 9 is a register map of a PARALLEL PORT ENABLE register, a PARALLEL PORT LOOPBACK register, a PARALLEL LOSS OF CLOCK STATUS register, a PARALLEL LOSS OF CLOCK MASK register, a PARALLEL SOC ERROR STATUS register, a PARALLEL SOC ERROR MASK register, a PARALLEL PARITY ERROR STATUS register, and a PARALLEL PARITY ERROR MASK register for the electrical apparatus shown in FIG. 1.

FIG. 10 is a register map of the PARALLEL CELL ERROR COUNTER registers for each parallel data input port of the electrical apparatus shown in FIG. 1.

FIG. 11 is a register map of the PARALLEL MUX SELECT registers for each serial data output port of the electrical apparatus shown in FIG. 1.

FIG. 12 is a register map of a SERIAL PORT ENABLE register, a SERIAL PORT LOOPBACK register, a SERIAL PORT STATUS register, a SERIAL PORT STATUS MASK register, a SERIAL BIP-8 ERROR register, a SERIAL BIP-8 ERROR MASK register, a SYNC DECODE NORMAL register, and a SYNC DECODE SWITCH register for the electrical apparatus shown in FIG. 1.

FIG. 13 is a register map of the SERIAL CELL ERROR COUNTER registers for each serial data input port of the electrical apparatus shown in FIG. 1.

FIG. 14 is a register map of the SERIAL MUX SELECT registers for each parallel data output port of the electrical apparatus shown in FIG. 1.

FIG. 15 is a register map of a MODE CONTROL register, a SWITCH-OVER CONTROL register, a SWITCH-OVER IDLE LIMIT register, a BACK-PRESSURE CONTROL register, a PLL MINIMUM register, a PLL MAXIMUM register, a RAM BIST CONTROL register, a RAM BIST RESULTS PRAM1-8 register, and a RAM BIST RESULTS SRAM1-4 register for the electrical apparatus shown in FIG. 1.

FIG. 18 shows the format of an ATM idle cell that may be generated for transmission across parallel data lines by an ASIC incorporating the capabilities of the electrical apparatus shown in FIG. 1.

FIG. 19 shows how BIP-8 parity is derived.

DETAILED DESCRIPTION OF THE INVENTION

Figure 1:
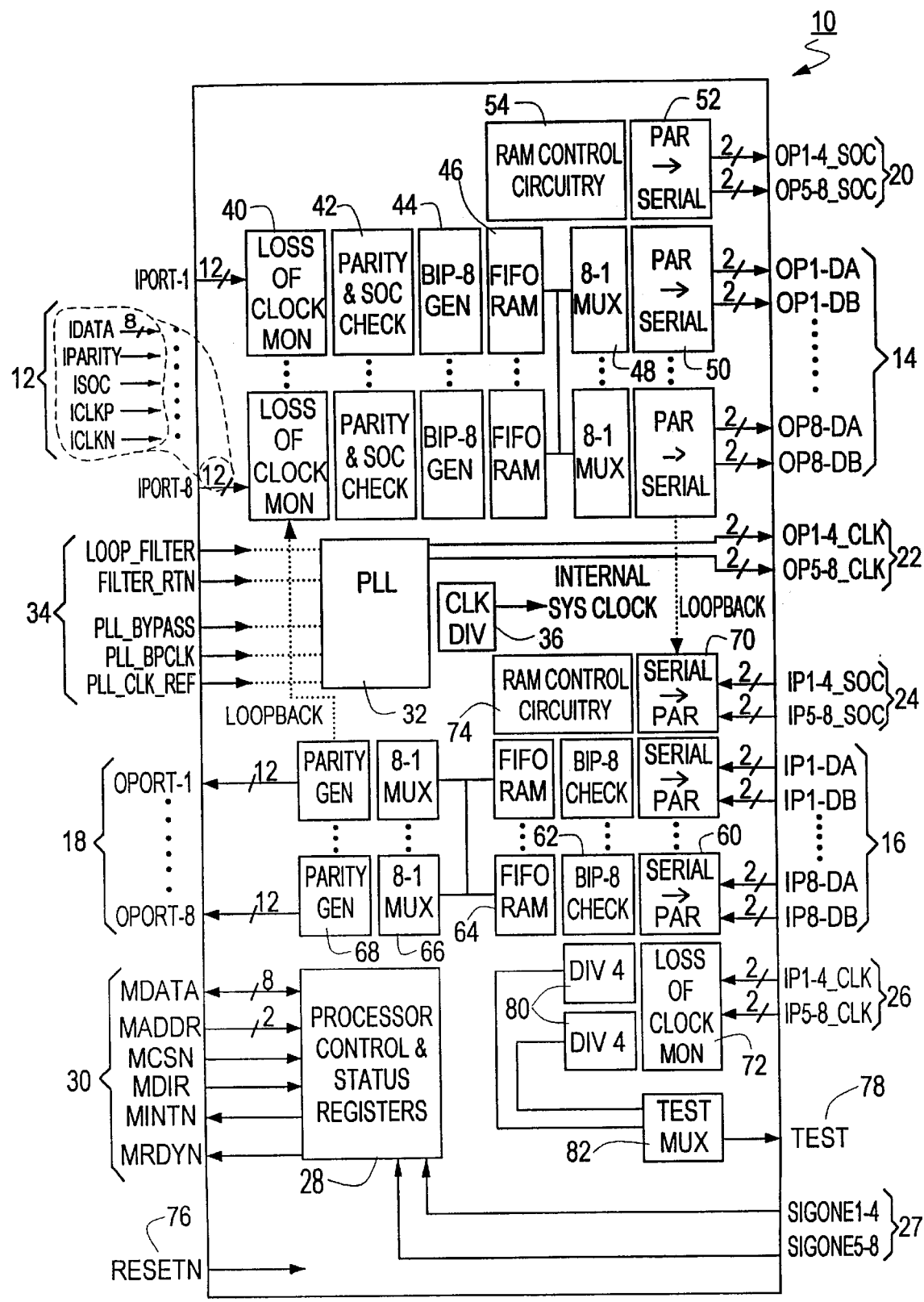
FIG. 1 is a functional block diagram of an electrical apparatus which may be used for transferring ATM cells across a backplane in a network switch according to the present invention.

Referring to FIG. 1, there is shown a functional block diagram of an electrical apparatus 10 which may be used for transferring asynchronous transfer mode (ATM) cells across a backplane in a network switch according to the present invention. The electrical apparatus 10 may be provided in either discrete or integrated circuit form and is capable of operating in a high speed ATM network switch.

The electrical apparatus 10 receives parallel data signals on eight parallel data input ports (IPORT-1 thru IPORT-8) 12 and transmits serial data signals on sixteen serial data output ports (OP1-DA, OP1-DB thru OP8-DA, OP8-DB) 14. The electrical apparatus 10 also receives serial data signals on sixteen serial data input ports (IP1-DA, IP1-DB thru IP8-DA, IP8-DB) 16 and transmits parallel data signals on eight parallel data output ports (OPORT-1 thru OPORT-8) 18.

It should be noted that the sixteen serial data output ports 14 are paired together so as to form eight corresponding pairs of serial data output ports (for example, OP1-DA and OP1-DB make up a corresponding pair). It should also be noted that the sixteen serial data input ports 16 are paired together so as to form eight corresponding pairs of serial data input ports (for example, IP1-DA and IP1-DB make up a corresponding pair).

As indicated in FIG. 1, each of the eight parallel data input ports 12 comprises eight data signal lines (IDATA), a parity signal line (IPARITY), a start-of-cell signal line (ISOC), and two differential clock signal lines (ICLKP, ICLKN). Each of the eight parallel data output ports 18 comprises similar signal lines (ODATA, OPARITY, OSOC, OCLKP, and OCLKN).

Each of the sixteen serial data output ports 14 comprises two differential data signal lines. The sixteen serial data output ports 14 share common start-of-cell signals (OP1-4_SOC, OP5-8_SOC) 20 and clock signals (OP1-4_CLK, OP5-8_CLK) 22. That is, the first eight of the sixteen serial data output ports (OP1-DA, OP1-DB thru OP4-DA, OP4-DB) share common start-of-cell signal OP1-4_SOC and clock signal OP1-4_CLK, and the second eight of the sixteen serial data output ports (OP5-DA, OP5-DB thru OP8-DA, OP8-DB) share common start-of-cell signal OP5-8_SOC and clock signal OP5-8_CLK. The start-of-cell signals (OP1-4_SOC, OP5-8_SOC) 20 and clock signals (OP1-4_CLK, OP5-8_CLK) 22 are differential signals requiring two signal lines.

Each of the sixteen serial data input ports 16 comprises two differential data signal lines. The sixteen serial data input ports 16 share common start-of-cell signals (IP1-4_SOC, IP5-8_SOC) 24 and clock signals (IP1-4_CLK, IP5-8_CLK) 26. That is, the first eight of the sixteen serial data input ports (IP1-DA, IP1-DB thru IP4-DA, IP4-DB) share common start-of-cell signal IP1-4_SOC and clock signal IP1-4_CLK, and the second eight of the sixteen serial data input ports (IP5-DA, IP5-DB thru IP8-DA, IP8-DB) share common start-of-cell signal IP5-8_SOC and clock signal IP5-8_CLK. The start-of-cell signals (IP1-4_SOC, IP5-8_SOC) 24 and clock signals (IP1-4_CLK, IP5-8_CLK) 26 are differential signals requiring two signal lines.

The sixteen serial data input ports 16, the common start-of-cell signals 24, and the common clock signals 26 share common serial input gone signals (SIGONE1-4, SIGONE5-8) 27. That is, the first eight of the sixteen serial data input ports (IP1-DA, IP1-DB thru IP4-DA, IP4-DB) and the associated common start-of-cell signal (IP1-4_SOC) and common clock signal (IP1-4_CLK) share common serial input gone signal SIGONE1-4, and the second eight of the sixteen serial data input ports (IP5-DA, IP5-DB thru IP8-DA, IP8-DB) and the associated common start-of-cell signal (IP5-8_SOC) and common clock signal (IP5-8_CLK) share common serial input gone signal SIGONE5-8. The serial input gone signals (SIGONE1-4, SIGONE5-8) 27 indicate that all of the serial data input signals in a group (for example, IP1-DA, IP1-DB thru IP4-DA, IP4-DB; IP1-4_SOC; and IP1-4_CLK) are gone (i.e., whatever circuitry was driving these signals is no longer present). The serial input gone signals (SIGONE1-4, SIGONE5-8) 27 are pulled-up within the electrical apparatus 10 to make these signals active high, meaning that when these signals are high, the circuitry that was driving these signals is no longer present.

The electrical apparatus 10 converts parallel data that is received on parallel data input ports (IPORT-1 thru IPORT-8) 12 to serial data that is transmitted on serial data output ports (OP1-DA, OP1-DB thru OP8-DA, OP8-DB) 14. The parallel data that is received on each parallel data input port (for example, IPORT-1) is divided and transmitted from one of the corresponding pairs of serial data output ports (for example, OP1-DA and OP1-DB). That is, each eight-bit byte that is received on a parallel data input port is divided into two four-bit nibbles which are then transmitted serially from one of the corresponding pairs of serial data output ports.

The electrical apparatus 10 also converts serial data that is received on serial data input ports (IP1-DA, IP1-DB thru IP8-DA, IP8-DB) 16 to parallel data that is transmitted on parallel data output ports (OPORT-1 thru OPORT-8) 18. The serial data that is received on one of the corresponding pairs of serial data input ports (for example, IP1-DA and IP1-DB) is combined and transmitted from a parallel data output port (for example, OPORT-1). That is, each four-bit nibble of data that is received on a serial data input port is combined with another four-bit nibble of data that is received on a corresponding serial data input port and then the combined data is transmitted as an eight-bit byte from a parallel data output port.

In addition to converting parallel input data to serial output data and converting serial input data to parallel output data, the electrical apparatus 10 can direct converted parallel input data from any of the parallel data input ports 12 to any of the corresponding pairs of serial data output ports 14 and can direct converted serial input data from any of the corresponding pairs of serial data input ports 16 to any of the parallel data output ports 18.

The electrical apparatus 10 can also direct converted parallel input data from any of the parallel data input ports 12 to more than one of the corresponding pairs of serial data output ports 14. The electrical apparatus 10 can also direct converted serial input data from any of the corresponding pairs of serial data input ports 16 to more than one parallel data output ports 18.

The electrical apparatus 10 can further direct converted serial input data from more than one of the corresponding pairs of serial data input ports 16 to a single parallel data output port 18. The electrical apparatus 10 can further direct converted parallel input data from a single parallel data input port 12 to either of one or another of the corresponding pairs of serial data output ports 14 according to the value of a switching bit in a cell header of the converted parallel input data.

The electrical apparatus 10 comprises processor control and status registers 28 for controlling the above-described functions. The processor control and status registers 28, which are interfaced through a plurality of control signal lines 30, allow an external system processor (not shown) to control the flow of ATM data cells through the electrical apparatus 10. The control signal lines 30 comprise eight data signal lines (MDATA), two address signal lines (MADDR), a chip select signal line (MCSN), a data direction signal line (MDIR), an interrupt signal line (MINTN), and a data ready signal line (MRDYN).

Associated with each parallel data input port 12 is a loss of clock monitor circuit 40, a parity and start-of-cell (SOC) check circuit 42, a bit interleaved parity (BIP-8) generator circuit 44, and a one-cell FIFO RAM 46. Associated with each of the corresponding pairs of serial data output ports 14 is an 8-to-1 multiplexer 48 and a parallel-to-serial converter 50. A parallel-to-serial converter 52 is also associated with the common start-of-cell signals (OP1-4_SOC, OP5-8_SOC) 20. RAM control circuitry 54 is provided to control the one-cell FIFO RAM 46 and to assist the processor control and status registers 28 in controlling the flow of ATM data cells from the parallel data input ports 12 to the serial data output ports 14.

The electrical apparatus 10 comprises a phase-locked-loop (PLL) circuit 32 for generating the clock signals OP1-4_CLK and OP5-8_CLK 22. The PLL circuit 32 is controlled by external components (not shown) through a plurality of control signal lines 34, which include a loop filter signal line (LOOP_FILTER), a loop filter return signal line (FILTER_RTN), a phase-locked-loop bypass signal line (PLL_BYPASS), a phase-locked-loop bypass clock signal line (PLL_BPCLK), and a phase-locked-loop clock reference signal line (PLL_CLK_REF). The PLL circuit 32, along with a clock divide circuit 36, provides an internal system clock signal for the electrical apparatus 10.

Associated with each of the corresponding pairs of serial data input ports 16 is a serial-to-parallel converter 60, a BIP-8 check circuit 62, and a 2-cell FIFO RAM 64. Associated with each parallel data output port 18 is an 8-to-1 multiplexer 66 and a parity generator circuit 68. A serial-to-parallel converter 70 is also associated with the common start-of-cell signals (IP1-4_SOC, IP5-8_SOC) 24, and a loss of clock monitor circuit 72 is associated with the common clock signals (IP1-4_CLK, IP5-8_CLK) 26. RAM control circuitry 74 is provided to control the 2-cell FIFO RAM 64 and to assist the processor control and status registers 28 in controlling the flow of ATM data cells from the serial data input ports 16 to the parallel data output ports 18.

It should be noted that a reset signal line (RESETN) 76 is provided for resetting all of the circuitry within the electrical apparatus 10, and a test signal line (TEST) 78 is provided for monitoring the common clock signals (IP1-4_CLK, IP5-8_CLK) 26 after they have been processed by divide-by-four circuits 80 and passed through a test multiplexer 82. It should be also noted that other signals may be monitored via the test signal line (TEST) 78, as described in more detail below.

Figure 2:
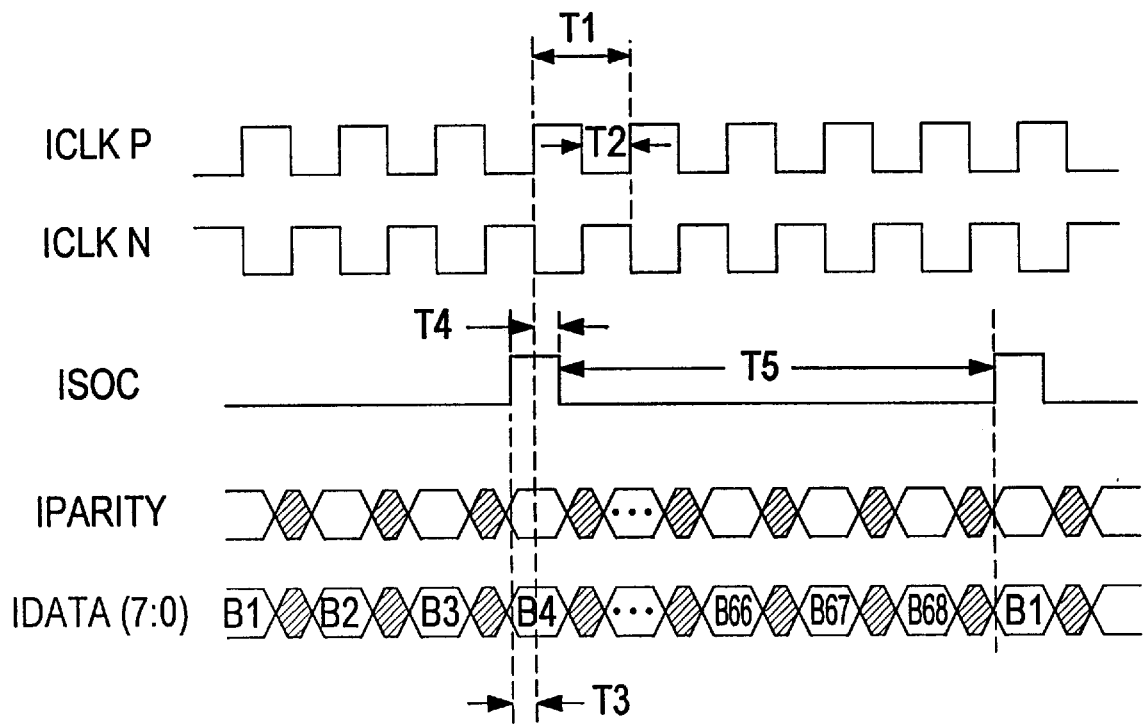
FIG. 2 is an interface timing diagram for the parallel data input ports of the electrical apparatus shown in FIG. 1.

Referring to FIG. 2, there is shown an interface timing diagram for the parallel data input ports (IPORT-1 thru IPORT-8) 12. Each eight-bit byte in a data cell is represented by B1, B2, B3, and so on. Typical timing ranges are also provided.

Figure 3:
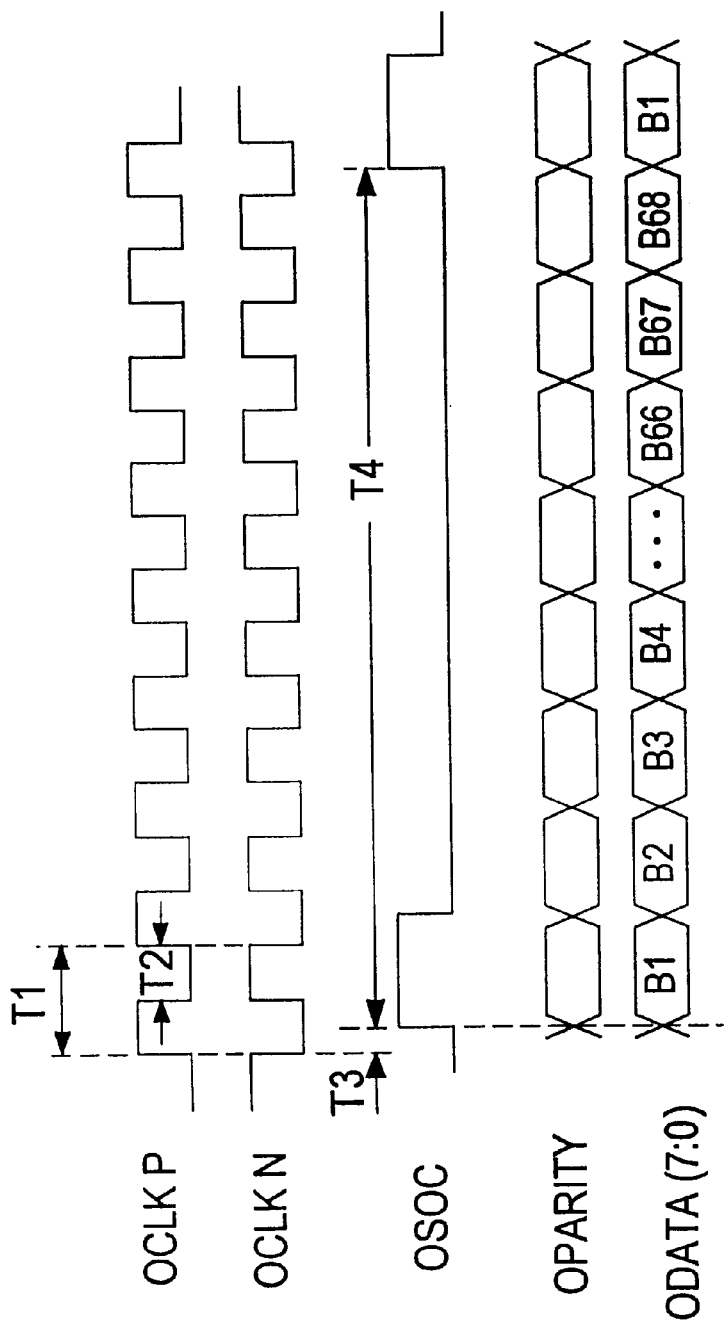
FIG. 3 is an interface timing diagram for the parallel data output ports of the electrical apparatus shown in FIG. 1.

Referring to FIG. 3, there is shown an interface timing diagram for the parallel data output ports (OPORT-1 thru OPORT-8) 18. Each eight-bit byte in a data cell is represented by B1, B2, B3, and so on. Typical timing ranges are also provided.

Figure 4:
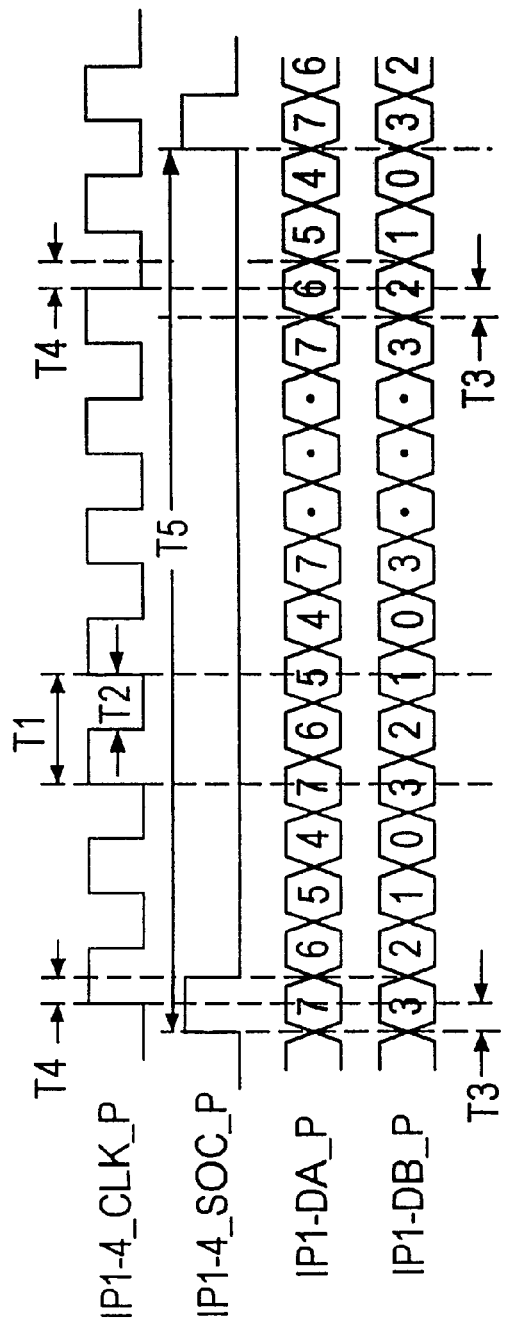
FIG. 4 is an interface timing diagram for the serial data input ports of the electrical apparatus shown in FIG. 1.

Referring to FIG. 4, there is shown an interface timing diagram for the serial data input ports (IP1-DA, IP1-DB thru IP8-DA, IP8-DB) 16. Each bit in a data cell is represented by 7, 6, 5, and so on. For simplicity of the diagram, only the positive signal of each differential pair is shown. Typical timing ranges are also provided.

Figure 5:
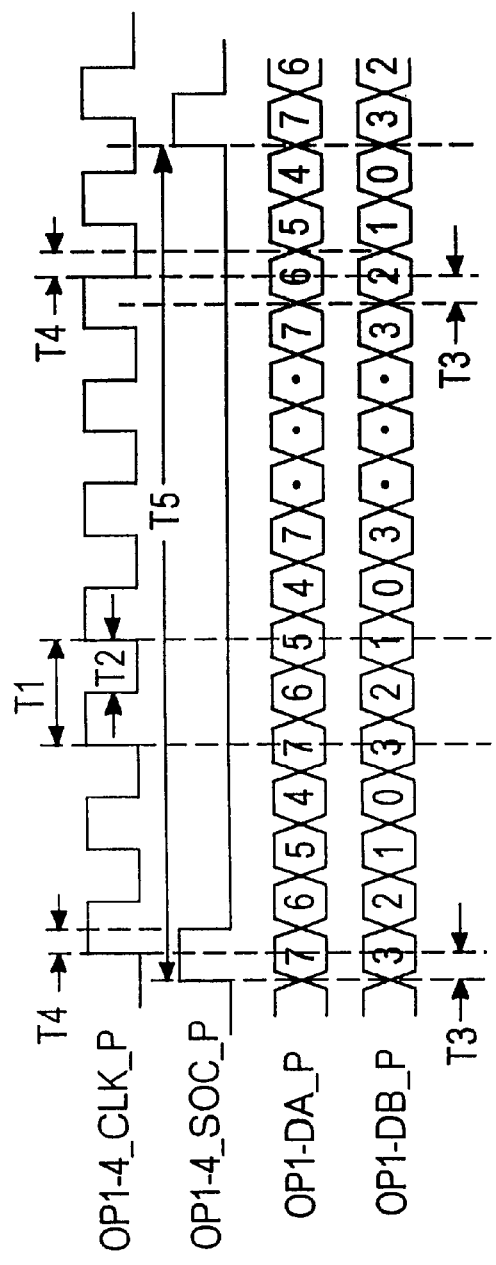
FIG. 5 is an interface timing diagram for the serial data output ports of the electrical apparatus shown in FIG. 1.

Referring to FIG. 5, there is shown an interface timing diagram for the serial data output ports (OP1-DA, OP1-DB thru OP8-DA, OP8-DB) 14. Each bit in a data cell is represented by 7, 6, 5, and so on. For simplicity of the diagram, only the positive signal of each differential pair is shown. Typical timing ranges are also provided.

Figure 6:
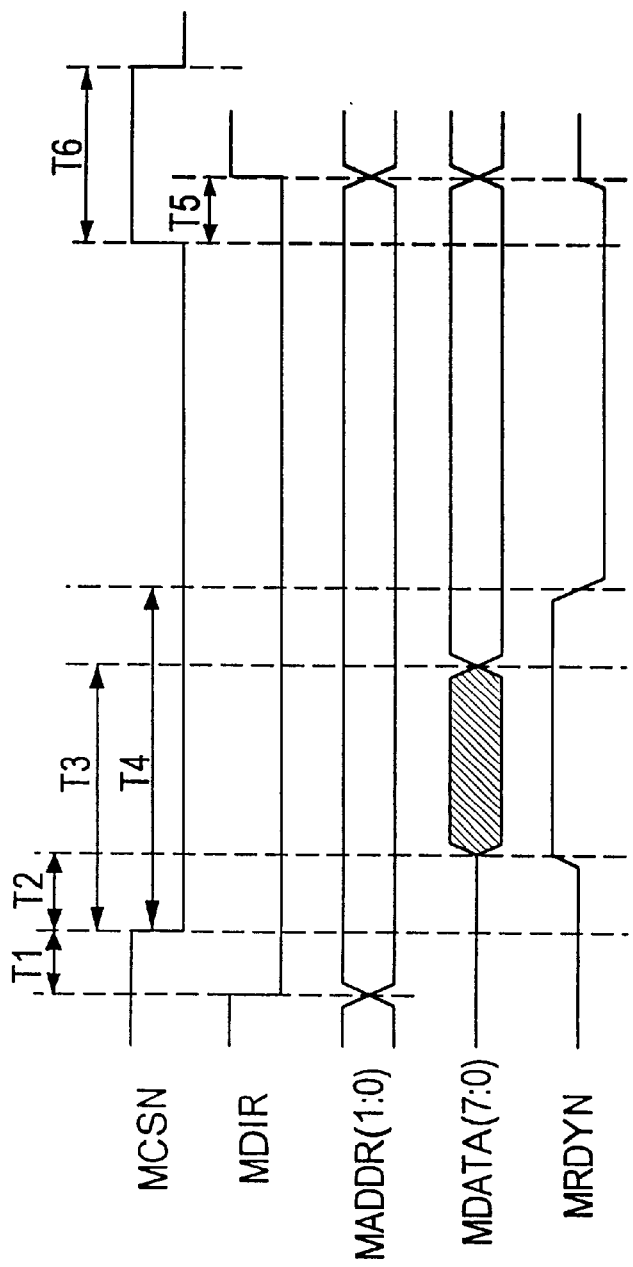
FIG. 6 is an interface timing diagram for reading from the processor control and status registers of the electrical apparatus shown in FIG. 1.

Referring to FIG. 6, there is shown an interface timing diagram for reading from the processor control and status registers 28. Typical timing ranges are also provided.

Figure 7:
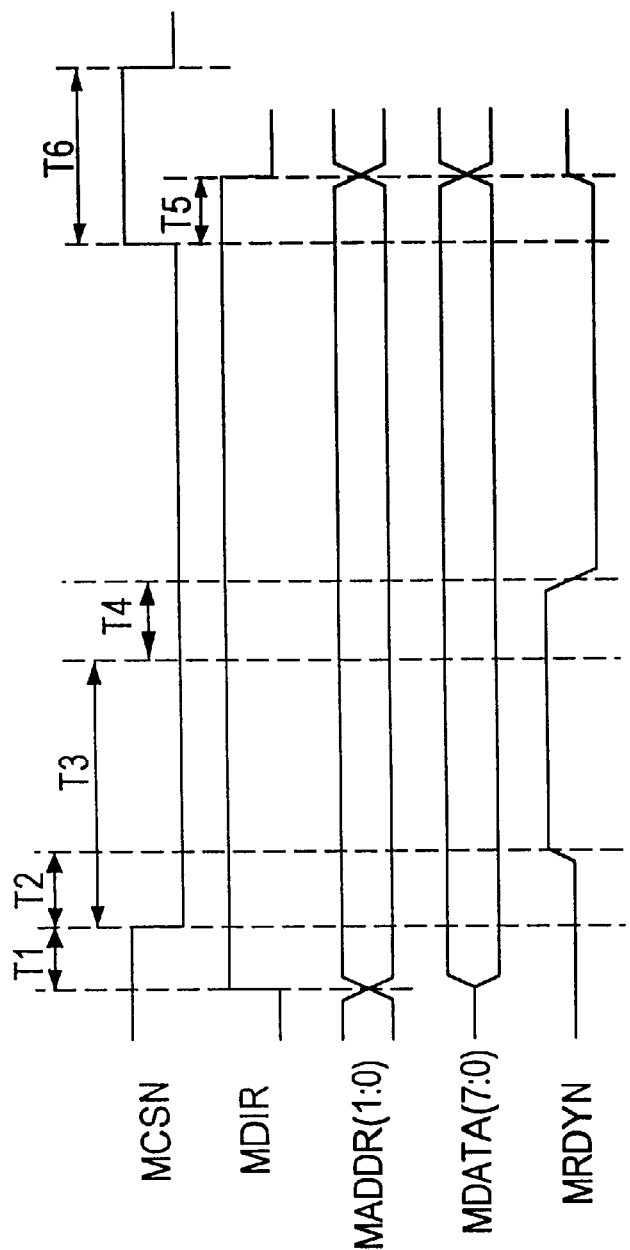
FIG. 7 is an interface timing diagram for writing to the processor control and status registers of the electrical apparatus shown in FIG. 1.

Referring to FIG. 7, there is shown an interface timing diagram for writing to the processor control and status registers 28. Typical timing ranges are also provided.

As mentioned above, the processor control and status registers 28 allow an external system processor (not shown) to control the flow of ATM data cells through the electrical apparatus 10. There are a total of fifty-seven processor control and status registers 28. All of these processor control and status registers 28 are accessible through three directly addressable registers: a DATA register, an INDIRECT READ ADDRESS register, and an INDIRECT WRITE ADDRESS register.

Referring to FIG. 8, there is shown a register map of the DATA register, the INDIRECT READ ADDRESS register, and the INDIRECT WRITE ADDRESS register. All three of these directly addressable registers have read/write capability. However, writing to the INDIRECT READ ADDRESS register will overwrite the DATA register.

To write to one of the processor control and status registers 28, the write data must be written into the DATA register, and the address of the particular processor control and status register must be written into the INDIRECT WRITE ADDRESS register. The electrical apparatus 10 will then transfer the write data from the DATA register to the particular processor control and status register.

To read from one of the processor control and status registers 28, the address of the particular processor control and status register must be written into the INDIRECT READ ADDRESS register. The electrical apparatus 10 will then transfer the read data from the particular processor control and status register to the DATA register.

Referring to FIG. 9, there is shown a register map of a PARALLEL PORT ENABLE register, a PARALLEL PORT LOOPBACK register, a PARALLEL LOSS OF CLOCK STATUS register, a PARALLEL LOSS OF CLOCK MASK register, a PARALLEL SOC ERROR STATUS register, a PARALLEL SOC ERROR MASK register, a PARALLEL PARITY ERROR STATUS register, and a PARALLEL PARITY ERROR MASK register.

A bit in the PARALLEL PORT ENABLE register is set to allow data traffic to flow from a particular parallel data input port 12. When a particular parallel data input port 12 is disabled, all error monitoring for that port is also disabled. However, the current status bits (see below) for that port remain unchanged when it is disabled. Also, each parallel data input port 12 should be disabled before being put into loopback mode (see below). After being put into loopback mode, a parallel data input port 12 should be enabled to allow loopback traffic to flow. The bits in the PARALLEL PORT ENABLE register default to 00 hex.

A bit in the PARALLEL PORT LOOPBACK register is set to place a particular parallel data input port 12 into loopback mode. When in loopback mode, the particular parallel data input port 12 will ignore any received parallel data (IDATA), parity (IPARITY), start-of-cell (ISOC), and differential clock (ICLKP, ICLKN) signals. The particular parallel data input port 12 will instead allow data traffic from a corresponding parallel data output port 18 to flow from the particular parallel data input port 12. That is, for example, when parallel data input port IPORT-1 is placed in loopback mode, the received parallel data (IDATA), parity (IPARITY), start-of-cell (ISOC), and differential clock (ICLKP, ICLKN) signals will be ignored and the transmitted parallel data (ODATA), parity (OPARITY), start-of-cell (OSOC), and differential clock (OCLKP, OCLKN) signals from parallel data output port OPORT-1 will instead flow from parallel data input port IPORT-1. It should be noted that the transmitted parallel data (ODATA), parity (OPARITY), start-of-cell (OSOC), and differential clock (OCLKP, OCLKN) signals from parallel data output port OPORT-1 will still be transmitted from parallel data output port OPORT-1. The bits in the PARALLEL PORT LOOPBACK register default to 00 hex.

A bit in the PARALLEL LOSS OF CLOCK STATUS register is set when a particular parallel data input port clock signal (ICLKP, ICLKN) does not toggle. The PARALLEL LOSS OF CLOCK STATUS register bits are cleared on read if the particular parallel data input port clock signal (ICLKP, ICLKN) returns. The PARALLEL LOSS OF CLOCK STATUS register bits are written to for diagnostic purposes only. The bits in the PARALLEL LOSS OF CLOCK STATUS register default to 00 hex.

A bit in the PARALLEL LOSS OF CLOCK MASK register is set to cause an interrupt (MINTN) when a particular parallel data input port clock signal (ICLKP, ICLKN) does not toggle. The bits in the PARALLEL LOSS OF CLOCK MASK register default to 00 hex.

A bit in the PARALLEL SOC ERROR STATUS register is set when a particular parallel data input port start-of-cell signal (ISOC) is detected out of place. The PARALLEL SOC ERROR STATUS register bits are cleared on read. The PARALLEL SOC ERROR STATUS register bits are written to for diagnostic purposes only. The bits in the PARALLEL SOC ERROR STATUS register default to 00 hex.

A bit in the PARALLEL SOC ERROR MASK register is set to cause an interrupt (MINTN) when a particular parallel data input port start-of-cell signal (ISOC) is detected out of place. The bits in the PARALLEL SOC ERROR MASK register default to 00 hex.

A bit in the PARALLEL PARITY ERROR STATUS register is set when a parity error is detected on a particular parallel data input port. A parity error also increments the PARALLEL CELL ERR COUNTER register (see below). The PARALLEL PARITY ERROR STATUS register bits are cleared on read. The PARALLEL PARITY ERROR STATUS register bits are written to for diagnostic purposes only. The bits in the PARALLEL PARITY ERROR STATUS register default to 00 hex.

A bit in the PARALLEL PARITY ERROR MASK register is set to cause an interrupt (MINTN) when a parity error is detected on a particular parallel data input port. The bits in the PARALLEL PARITY ERROR MASK register default to 00 hex.

Referring to FIG. 10, there is shown a register map of the PARALLEL CELL ERROR COUNTER registers for each parallel data input port 12. A PARALLEL CELL ERROR COUNTER register is incremented when a cell is received with a parity error on a corresponding parallel data input port 12. The PARALLEL CELL ERROR COUNTER registers do not roll over, they lock at the top. The PARALLEL CELL ERROR COUNTER registers reset on read.

Referring to FIG. 11, there is shown a register map of the PARALLEL MUX SELECT registers for each serial data output port 14. The bits in the PARALLEL MUX SELECT registers (SEL(2:0)) are set to select which particular parallel data input port 12 will provide data traffic to a particular serial data output port 14. The bits in the PARALLEL MUX SELECT registers are decoded as follows:

| SEL (2:0) | PARALLEL PORT |
|---|---|
| 0 | 1 |
| 1 | 2 |
| 2 | 3 |
| 3 | 4 |
| 4 | 5 |
| 5 | 6 |
| 6 | 7 |
| 7 | 8 |

Referring to FIG. 12, there is shown a register map of a SERIAL PORT ENABLE register, a SERIAL PORT LOOPBACK register, a SERIAL PORT STATUS register, a SERIAL PORT STATUS MASK register, a SERIAL BIP-8 ERROR register, a SERIAL BIP-8 ERROR MASK register, a SYNC DECODE NORMAL register, and a SYNC DECODE SWITCH register.

A bit in the SERIAL PORT ENABLE register is set to allow data traffic to flow from a particular serial data input port 16. When a particular serial data input port 16 is disabled, all error monitoring for that port is also disabled. However, the current status bits (see below) for that port remain unchanged when it is disabled. Also, each serial data input port 16 should be disabled before being put into loopback mode (see below). After being put into loopback mode, a serial data input port 16 should be enabled to allow loopback traffic to flow. The bits in the SERIAL PORT ENABLE register default to 00 hex.

A bit in the SERIAL PORT LOOPBACK register is set to place a particular group of serial data input ports 16 into loopback mode. When in loopback mode, the particular group of serial data input ports 16 will ignore any received serial data (for example, on serial data input ports IP1-DA, IP1-DB thru IP-4DA, IP-4-DB start-of-cell (for example, IP1-4_SOC), and clock (for example, IP1-4_CLK) signals. The particular group of serial data input ports 16 will instead allow data traffic from a corresponding group of serial data output ports 14 to flow from the particular group of serial data input ports 16. That is, for when serial data input ports IP1-DA, IP1-DB thru IP4-DA, IP4-DB are placed in loopback mode, the received serial data (on serial data input ports IP1-DA, IP1-DB thru IP4-DA, IP4-DB), start-of-cell (IP1-4_SOC), and differential clock (IP1-4_CLK) signals will be ignored and the transmitted serial data (on serial data output ports OP1-DA, OP1-DB thru OP4-DA, OP4-DB), start-of-cell (OP1-4_SOC), and differential clock (OP1-4_CLK) signals from serial data output ports OP1-DA, OP1-DB thru OP4-DA, OP4-DB will instead flow from serial data input ports IP1-DA, IP1-DB thru IP4-DA, IP4-DB. It should be noted that the transmitted serial data (on serial data output ports OP1-DA, OP1-DB thru OP4-DA, OP4-DB), start-of-cell (OP1-4_SOC), and differential clock (OP1-4_CLK) signals from serial data output ports OP1-DA, OP1-DB thru OP4-DA, OP4-DB will still be transmitted from serial data output ports OP1-DA, OP1-DB thru OP4-DA, OP4-DB. The bits in the SERIAL PORT LOOPBACK register default to 00 hex.

The LOSS OF CLOCK bits (1-4 LOC, 5-8 LOC) in the SERIAL PORT STATUS register are set when a serial data input port clock signal (IP1-4_CLK, IP5-8_CLK) does not toggle. The LOSS OF CLOCK bits are cleared on read if the serial data input port clock signal (IP1-4_CLK, IP5-8_CLK) returns. When a LOSS OF CLOCK bit is set for a particular serial data input port clock signal, the serial data input ports associated with that particular serial data input port clock signal are shut down. Those serial data input ports must be reenabled if and when the serial data input port clock signal returns.

The SOC ERROR bits (1-4 SOC, 5-8 SOC) in the SERIAL PORT STATUS register are set when a serial data input port start-of-cell signal (IP1-4_SOC, IP5-8_SOC) is detected out of place. The SOC ERROR bits are cleared on read.

The GONE ERROR bits (1-4 GONE, 5-8 GONE) in the SERIAL PORT STATUS register are set when the serial input gone signals (SIGONE1-4, SIGONE5-8) are active high. As described above, the serial input gone signals (SIGONE1-4, SIGONE5-8) 27 indicate that all of the serial data input signals in a group (for example, IP1-DA, IP1-DB thru IP4-DA, IP4-DB; IP1-4_SOC; and IP1-4_CLK) are gone (i.e., whatever circuitry that was driving these signals is no longer present). The GONE ERROR bits are cleared on read if the serial input gone signals (SIGONE1-4, SIGONE5-8) are inactive low (i.e., whatever circuitry that was driving the serial data input signals has returned). When a GONE ERROR bit is set for a particular group of serial data input signals, the serial data input ports associated with that particular group of serial data input signals are shut down. Those serial data input ports must be reenabled if and when the serial input gone signals (SIGONE1-4, SIGONE5-8) become inactive low and the associated GONE ERROR bits are cleared.

The OVERFLOW ERROR bits (1-4 OVER, 5-8 OVER) in the SERIAL PORT STATUS register are set when an overflow condition occurs in the 2-cell FIFO RAM 64. The OVERFLOW ERROR bits are cleared on read.

The LOSS OF CLOCK bits (1-4 LOC, 5-8 LOC) in the SERIAL PORT STATUS MASK register are set to cause an interrupt (MINTN) when a serial data input port clock signal (IP1-4_CLK, IP5-8_CLK) does not toggle.

The SOC ERROR bits (1-4 SOC, 5-8 SOC) in the SERIAL PORT STATUS MASK register are set to cause an interrupt (MINTN) when a serial data input port start-of-cell signal (IP1-4_SOC, IP5-8_SOC) is detected out of place.

The GONE ERROR bits (1-4 GONE, 5-8 GONE) in the SERIAL PORT STATUS MASK register are set to cause an interrupt (MINTN) when all of the serial data input signals in a group (for example, IP1-DA, IP1-DB thru IP4-DA, IP4-DB; IP1-4_SOC; and IP1-4_CLK) are gone (i.e., whatever circuitry was driving these signals is no longer present).

The OVERFLOW ERROR bits (1-4 OVER, 5-8 OVER) in the SERIAL PORT STATUS MASK register are set to cause an interrupt (MINTN) when an overflow condition occurs in the 2-cell FIFO RAM 64.

A bit in the BIP-8 ERROR register is set when an incorrect BIP-8 is detected on a particular serial data input port. A BIP-8 error also increments the SERIAL CELL ERR COUNTER register (see below). The BIP-8 ERROR register bits are cleared on read. The BIP-8 ERROR register bits are written to for diagnostic purposes only. The bits in the BIP-8 ERROR register default to 00 hex.

A bit in the BIP-8 ERROR MASK register is set to cause an interrupt (MINTN) when an incorrect BIP-8 is detected on a particular serial data input port. The bits in the BIP-8 ERROR MASK register default to 00 hex.

The SYNC DECODE NORMAL register and the SYNC DECODE SWITCH register are both reserved for future use.

Referring to FIG. 13, there is shown a register map of the SERIAL CELL ERROR COUNTER registers for each serial data input port 16. A SERIAL CELL ERROR COUNTER register is incremented when a cell is received with a BIP-8 error on an associated one of the corresponding pairs of serial data input ports 16. The SERIAL CELL ERROR COUNTER registers do not roll over, they lock at the top. The SERIAL CELL ERROR COUNTER registers reset on read. FIG. 19 shows how BIP-8 parity is derived.

Referring to FIG. 14, there is shown a register map of the SERIAL MUX SELECT registers for each parallel data (SEL(2:0)) are set to select which particular serial data input port 16 will provide data traffic to a particular parallel data output port 18. The bits in the SERIAL MUX SELECT registers are decoded as follows:

| SEL (2:0) | SERIAL PORT |
|---|---|
| 0 | 1 |
| 1 | 2 |
| 2 | 3 |
| 3 | 4 |
| 4 | 5 |
| 5 | 6 |
| 6 | 7 |
| 7 | 8 |

Referring to FIG. 15, there is shown a register map of a MODE CONTROL register, SWITCH-OVER CONTROL register, a SWITCH-OVER IDLE LIMIT register, a BACK-PRESSURE CONTROL register, a PLL MINIMUM register, a PLL MAXIMUM register, a RAM BIST CONTROL register, a RAM BIST RESULTS PRAM1-8 register, and a RAM BIST RESULTS SRAM1-4 register.

The START bit (bit 0) in the MODE CONTROL register is used once during initialization to allow the electrical apparatus 10 to begin processing cells. The START bit should be set after the PLL_CLK_REF signal is stable. Once the START bit is set, it should not be changed while the electrical apparatus 10 is in operational mode. Clearing the START bit will stop all cell processing immediately. The only reason to clear the START bit is if the PLL_CLK_REF signal has been lost. The START bit defaults to zero.

The SER_RST bit (bit 1) in the MODE CONTROL register resets a serial clock divider circuit associated with the PLL circuit 32 for test purposes. The SER_RST bit should be cleared for normal operation. The SER_RST bit defaults to one.

The SWITCH bit (bit 2) in the MODE CONTROL register, when set, causes the electrical apparatus 10 to enter a switching mode and a combining mode. The SWITCH bit defaults to zero.

In switching mode, only parallel data input port IPORT-1 and serial data output ports OP1-DA, OP1-DB, OP5-DA, and OP5-DB are used. In switching mode, a data cell received on parallel data input port IPORT-1 is sent out either corresponding pair of serial data output ports OP1-DA and OP1-DB or corresponding pair of serial data output ports OP5-DA and OP5-DB. A switching bit in the cell header (see FIG. 17) determines which corresponding pair of serial data output ports the data cell is sent out on. When the switching bit is one, a data cell received on parallel data input port IPORT-1 is sent out corresponding pair of serial data output ports OP1-DA and OP1-DB and an idle cell is sent out corresponding pair of serial data output ports OP5-DA and OP5-DB. When the switching bit is zero, a data cell received on parallel data input port IPORT-1 is sent out corresponding pair of serial data output ports OP5-DA and OP5-DB and an idle cell is sent out corresponding pair of serial data output ports OP1-DA and OP1-DB. An idle cell that is sent in switching mode comprises a copy of the data cell received on parallel data input port IPORT-1, except one byte is modified to be all ones.

In combining mode, only serial data input ports IP1-DA, IP1-DB, IP5-DA, and IP5-DB and parallel data output port OPORT-1 are used. In combining mode, non-idle data cells received on corresponding pair of serial data input ports IP1-DA and IP1-DB and corresponding pair of serial data input ports IP5-DA and IP5-DB are combined and sent out parallel data output port OPORT-1.

The PLL_DIS bit (bit 4) in the MODE CONTROL register is used to shut down the PLL circuit 32 for test purposes. The PLL_DIS bit defaults to zero and should not be changed. It should be noted that writing to the PLL_DIS bit will take the electrical apparatus 10 out of operational mode. When out of operational mode, the processor interface 30 will not work. A hard reset on the RESETN signal line 76 is required to recover.

The PD bit (bit 5) in the MODE CONTROL register is reserved for test purposes. The PD bit defaults to zero and should not be changed. It should be noted that writing to the PD bit will take the electrical apparatus 10 out of operational mode. When out of operational mode, the processor interface 30 will not work. A hard reset on the RESETN signal line 76 is required to recover.

The PARITY_EN bit (bit 6) in the MODE CONTROL register, when set, enables parity checking on the parallel data input ports 12. The PARITY_EN bit defaults to zero.

The SW_RST bit (bit 7) in the MODE CONTROL register, when set, places all of the control registers into their default state. The SW_RST bit defaults to zero. Thus, setting the SW_RST bit will automatically reset itself. It should be noted that the SW_RST bit will clear the START bit, which takes the electrical apparatus 10 out of operational mode.

The TSEL(2:0) bits (bits 0–2) in the SWITCH-OVER CONTROL register select which signal will be sent out the TEST pin 78. The TSEL(2:0) bits default to 3 after a hard reset, but to 1 after a software reset. The TSEL(2:0) bits in the SWITCH-OVER CONTROL register are decoded as follows:

| TSEL (2:0) | TEST PIN SIGNAL |
| --- | --- |
| 0 | recovered clock IP1-4_CLK |
| 1 | recovered clock IP5-8_CLK |
| 2 | output from PLL counter |
| 3 | GROUND |
| 4 | cell received on IPORT-1 |
| 5 | VCC |
| 6 | VCC |
| 7 | VCC |

The enable hardware backpressure (EN_HW_BP) bit (bit 3) in the SWITCH-OVER CONTROL register, when set, allows the electrical apparatus 10 to set bits in the node tag header of data cells (see FIG. 17) sent out of the parallel data output ports 18. This action informs devices which receive the data cells that the electrical apparatus 10 does not want to receive any more active data cells. This action is useful when switching between switch fabrics in a network switch, as it allows a first switch fabric to be drained of active data cells before switching to a second switch fabric. When the EN_HW_BP bit is cleared, the electrical apparatus 10 may not set the above-identified node tag header byte bits. The EN_HW_BP bit defaults to zero.

The enable hardware switch-over (EN_HW_SW) bit (bit 4) in the SWITCH-OVER CONTROL register, when set, allows the electrical apparatus 10 to be under hardware control when switching between switch fabrics in a network switch. When the EN_HW_SW bit is cleared, the electrical apparatus 10 listens to the SW_SF bit (see below) instead. The EN_HW_SW bit defaults to zero.

The enable resync (EN_RESYNC) bit (bit 5) in the SWITCH-OVER CONTROL register, when set, allows the electrical apparatus 10 to toggle the START bit in the MODE CONTROL register during a switch-over. The EN_RESYNC bit defaults to zero and should not be changed for normal operation.

The software switch fabric (SW_SF) bit (bit 6) in the SWITCH-OVER CONTROL register, when set, allows the electrical apparatus 10 to be under software control when switching between switch fabrics in a network switch. That is, if the EN_HW_SW bit is not set, the electrical apparatus 10 looks to the SW_SF bit when switching between switch fabrics in a network switch. The SW_SF bit is useful for stand-alone diagnostic testing of the electrical apparatus 10. The SW_SF bit defaults to zero.

The power down enable (PD_ENB) bit (bit 7) in the SWITCH-OVER CONTROL register, when set, allows the electrical apparatus 10 to power down the serial data input ports associated with the particular group of serial data input signals that are no longer present according to the GONE ERROR bits (1-4 GONE, 5-8 GONE) in the SERIAL PORT STATUS register.

The bits (LIM(7:0)) in the SWITCH-OVER IDLE LIMIT register contains the number of consecutive idle cells that must be received when switching between switch fabrics in a network switch before the electrical apparatus 10 assumes that a first switch fabric has been drained of all active data cells before switching to a second switch fabric. The LIM (7:0) bits default to 10 hex.

The force backpressure (FORCE_BP) bit (bit 0) in the BACK-PRESSURE CONTROL register, when set, will cause the electrical apparatus 10 to overwrite bits 0–7 of bytes 4–8 in the node tag header of data cells transmitted from the parallel data output ports 18 with the value of BP_VALUE bit (see below). When the FORCE_BP bit is set, the electrical apparatus 10 will also set bits 4–7 of byte 9 in the node tag header of data cells transmitted from the parallel data output ports 18. The FORCE-BP bit defaults to zero. The backpressure value (BP_VALUE) bit (bit 1) in the BACK-PRESSURE CONTROL register contains the value used when forcing backpressure. The BP_VALUE bit defaults to one, and should be programmed to one for normal operation. The BP_VALUE bit can be programmed to zero and used with the FORCE_BP bit during loopback mode for testing.

The bits (MIN(6:0) and MAX(6:0)) in the PLL MIN and PLL MAX registers, respectively, are used to monitor the PLL circuit 32 to verify that it is in lock. If the PLL circuit 32 is locked, the contents of the PLL MIN and PLL MAX registers should have approximately the same value. If the difference between the values of the contents of the PLL MIN and PLL MAX registers grows, the PLL circuit 32 is not locked.

The bits (MODE(1:0)) in the RAM BIST CONTROL register control the RAM built-in self test (BIST) mode. The MODE(1:0) bits in the RAM BIST CONTROL register are decoded as follows:

| MODE (1:0) | MODE |
| --- | --- |
| 0 | Bypass |
| 1 | Force Failure |
| 2 | Run BIST |
| 3 | not used |

The BIST reset (BRESETN) bit (bit 2) in the RAM BIST CONTROL register is an active low reset to BIST logic associated with both sets of RAM control circuitry 54 and 74. The BRESETN bit defaults to zero and should be low for normal operation. The BRESETN bit must be set to enter any of the BIST modes.

The mode done (DONE*) bit (bit 7) in the RAM BIST CONTROL register is a read-only bit. The DONE* bit indicates that the latest RAM BIST mode that was entered into is done and the results are contained in the RAM BIST RESULTS registers (see below). To clear the DONE* bit, the BRESETN bit must be cleared.

The bits (FAIL(8:1) and FAIL(4:1)) in the RAM BIST RESULTS PRAM1-8 (RAM 46 for parallel data input ports IPORT-1 thru IPORT-8) and RAM BIST RESULTS SRAM1-4 (RAM 64 for serial data input ports IP1-DA, IP1-DB thru IP4-DA, IP4-DB) registers indicate faults in the PRAMs and the SRAMs, respectively. The FAIL bits are active high, meaning one indicates a fault. To clear the FAIL bits, the BRESETN bit must be cleared.

Figures 16, 17:
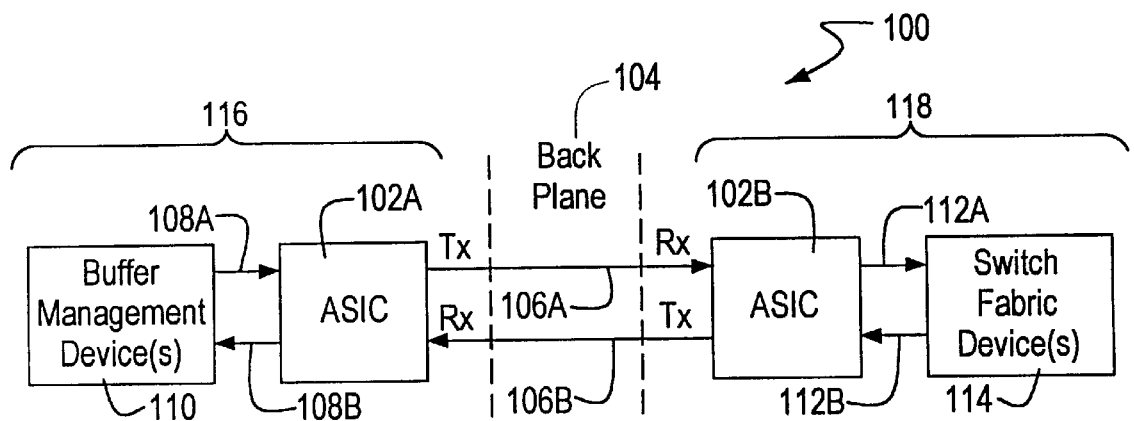
FIG. 16 is a portion of an ATM network switch comprising two application specific integrated circuits (ASICs) incorporating the capabilities of the electrical apparatus shown in FIG. 1.
FIG. 17 shows the format of an ATM data cell that travels across parallel data lines between a buffer management device and an ASIC incorporating the capabilities of the electrical apparatus shown in FIG. 1, and the format of an ATM data cell that travels across parallel data lines between and a switch fabric device and an ASIC incorporating the capabilities of the electrical apparatus shown in FIG. 1.

In one specific embodiment, the electrical apparatus 10 described above may be provided in integrated circuit form for use in an ATM network switch. Referring to FIG. 16, there is shown a portion of an ATM network switch 100 comprising two application specific integrated circuits (ASICs) 102A and 102B incorporating the capabilities of the electrical apparatus 10 described above. The two ASICs 102A and 102B are communicating across a backplane 104 over serial data lines 106A and 106B. The serial data line 106A interfaces with ASIC 102A via serial data output ports OP1-DA, OP1-DB thru OP8-DA, OP8-DB, as described above. The serial data line 106A interfaces with ASIC 102B via serial data input ports IP1-DA, IP1-DB thru IP8-DA, IP8-DB, as described above. The serial data line 106B interfaces with ASIC 102B via serial data output ports OP1-DA, OP1-DB thru OP8-DA, OP8-DB, as described above. The serial data line 106B interfaces with ASIC 102A via serial data input ports IP1-DA, IP1-DB thru IP8-DA, IP8-DB, as described above.

The ASIC 102A is also communicating over parallel data lines 108A and 108B with one or more Buffer Management devices 110. The parallel data line 108A interfaces with ASIC 102A via parallel data input ports IPORT-1 thru IPORT-8, as described above. The parallel data line 108B interfaces with ASIC 102A via parallel data output ports OPORT-1 thru OPORT-8, as described above.

The ASIC 102B is also communicating over parallel data lines 112A and 112B with one or more Switch Fabric devices 114. The parallel data line 112A interfaces with ASIC 102B via parallel data output ports OPORT-1 thru OPORT-8, as described above. The parallel data line 112B interfaces with ASIC 102B via parallel data input ports IPORT-1 thru IPORT-8, as described above.

It may be assumed that the ASIC 102A and the Buffer Management device(s) 110 are on a first printed circuit board 116 and that the ASIC 102B and the Switch Fabric device(s) 114 are on a second printed circuit board 118. The backplane 104 provides physical connections between the first printed circuit board 116 and the second printed circuit board 118, the first printed circuit board 116 provides physical connections between ASIC 102A and the Buffer Management device(s) 110, and the second printed circuit board 118 provides physical connections between ASIC 102B and the Switch Fabric device(s) 114. More specifically, the backplane 104 provides the serial data lines 106A and 106B between the two ASICs 102A and 102B, the first printed circuit board 116 provides the parallel data lines 108A and 108B between ASIC 102A and the Buffer Management device(s) 110, and the second printed circuit board 118 provides the parallel data lines 112A and 112B between ASIC 102B and the Switch Fabric device(s) 114. Through all of the above-described connections, the two ASICs 102A and 102B allow ATM data cells to be efficiently transferred between the Buffer Management device(s) 110 and the Switch Fabric device(s) 114.

Referring to FIG. 17, there is shown the format of an ATM data cell that travels across the parallel data lines 108A and 108B between ASIC 102A and the Buffer Management device(s) 110, and the format of an ATM data cell that travels across the parallel data lines 112A and 112B between ASIC 102B and the Switch Fabric device(s) 114. Referring to FIG. 18, there is shown the format of an ATM idle cell that may be generated by either ASIC 102A or ASIC 102B for transmission across either parallel data lines 108B or parallel data lines 112A.

The ATM data cells traveling across the parallel data lines 108A and 108B and the parallel data lines 112A and 112B typically use a 100 MHz clock (ICLKP, ICLKN, OCLKP, OCLKN), while the ATM data cells traveling across the serial data lines 106A and 106B typically use a 200 MHz clock (IP1-4_CLK, IP5-8_CLK, OP1-4_CLK, OP5-8_CLK). However, as shown in FIGS. 4 and 5, sampling occurs on both edges of the 200 MHz clock, so the ATM data cells traveling across the serial data lines 106A and 106B are essentially propagating at a 400 MHz clock rate. Thus, there is no reduction in the transmission rate for ATM data cells passing through either ASIC 102A or ASIC 102B.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An electrical apparatus for use in efficiently transferring data cells across a backplane in a network switch, said apparatus comprising:

a plurality of parallel data input ports for receiving parallel input data;

a first multiplexer for receiving said parallel input data and for directing said parallel input data to one or more of a plurality of first multiplexer outputs as multiplexed parallel input data;

a first converter in communication with said first multiplexer for converting said multiplexed parallel input data into serial output data;

a plurality of serial data output ports for transmitting said serial output data from said first converter to said backplane;

a plurality of serial data input ports for receiving serial input data from said backplane;

a second converter for converting said received serial input data from said plurality of serial data input ports into parallel output data;

a second multiplexer for receiving said parallel output data and for directing said parallel output data to one or more of a plurality of second multiplexer outputs as multiplexed parallel output data; and a plurality of parallel data output ports for transmitting said multiplexed parallel output data.

2. The apparatus as defined in claim 1, wherein said second multiplexer directs said multiplexed parallel output data originating from said backplane via more than one of said plurality of serial data input ports to a single one of said plurality of parallel data output ports.

3. The apparatus as defined in claim 1, wherein said plurality of serial data output ports comprises a plurality of corresponding pairs of serial data output subports, and wherein said first converter converts said received parallel input data into serial output subdata for transmission to said backplane from said plurality of corresponding pairs of serial data output subports.

4. The apparatus as defined in claim 1, wherein said plurality of serial data input ports comprises a plurality of corresponding pairs of serial data input subports for receiving serial input subdata from said backplane, wherein said second converting means converts received serial input subdata from said backplane via said plurality of corresponding pairs of serial data input subports into parallel output data.

5. The apparatus as defined in claim 1, further comprising first loopback means for directing parallel output data from any of said plurality of parallel data output ports to corresponding ones of said plurality of parallel data input ports.

6. The apparatus as defined in claim 1, further comprising second loopback means for directing serial output data from a group of said plurality of serial data output ports to a corresponding group of said plurality of serial data input ports.

* * * * *

UNITED STATES PATENT AND TRADEMARK OFFICE
CERTIFICATE OF CORRECTION

PATENT NO. : 6,192,046 B1  
DATED : February 20, 2001  
INVENTOR(S) : Mahesh N. Ganmukhi et al.

Page 1 of 1

It is certified that error appears in the above-identified patent and that said Letters Patent is hereby corrected as shown below:

Column 7,
Line 44, delete the number "5";

Column 9,
Line 62, "That is, for when" should read -- That is, for example, when --;

Column 11,
Line 28, "(SEL (2:0))" should read -- output port 18. The bits in the SERIAL MUX SELECT registers (SEL(2:0)) --; and
Line 46, "SWITCH" should read -- a SWITCH --.

Signed and Sealed this

Sixteenth Day of July, 2002

Attest:

JAMES E. ROGAN
Attesting Officer       Director of the United States Patent and Trademark Office